United States Patent [19]
Hulterstrum

[11] 3,857,467
[45] Dec. 31, 1974

[54] RELAY CLUTCH TIMER

[75] Inventor: Harold D. Hulterstrum, Baraboo, Wis.

[73] Assignee: Gulf & Western Industries, Inc., New York, N.Y.

[22] Filed: June 1, 1973

[21] Appl. No.: 365,848

[52] U.S. Cl............... 192/33 R, 192/46, 192/67 R, 192/142 R
[51] Int. Cl............................................ F16d 43/26
[58] Field of Search........ 192/33 R, 46, 67 R, 84 C, 192/90, 142 R; 74/125.5

[56] References Cited
UNITED STATES PATENTS

| | | | |
|---|---|---|---|
| 1,380,271 | 5/1921 | Thropp | 192/90 UX |
| 3,084,776 | 4/1963 | Rabinow | 192/67 R X |
| 3,120,298 | 2/1964 | Rossi | 192/142 R X |
| 3,187,864 | 6/1965 | Tonkin | 192/46 |
| 3,378,123 | 4/1968 | Papa, Jr. | 192/67 R |
| 3,603,437 | 9/1971 | Spencer | 192/67 R X |
| 3,667,307 | 6/1972 | Kelch | 192/46 X |
| 3,669,231 | 6/1972 | Schindel et al. | 192/84 C X |

*Primary Examiner*—Allan D. Herrmann

[57] ABSTRACT

A timer includes a clutch having a pair of opposite clutch elements and a central clutch element. The central clutch element is reversely positionable between the opposite clutch elements. In one position of the central clutch element, the clutch is normally engaged and is disengaged upon energization of a relay. In the opposite position of the central clutch element, the clutch is normally disengaged and is engaged upon energization of the same relay.

14 Claims, 5 Drawing Figures

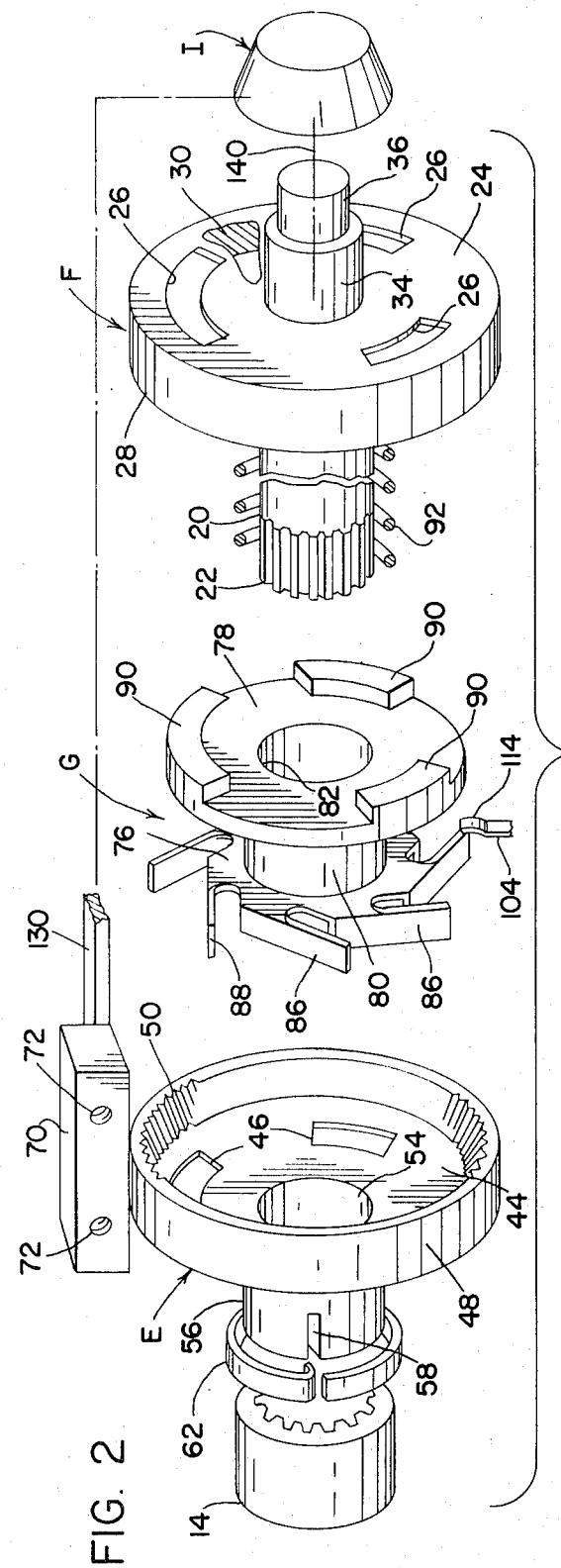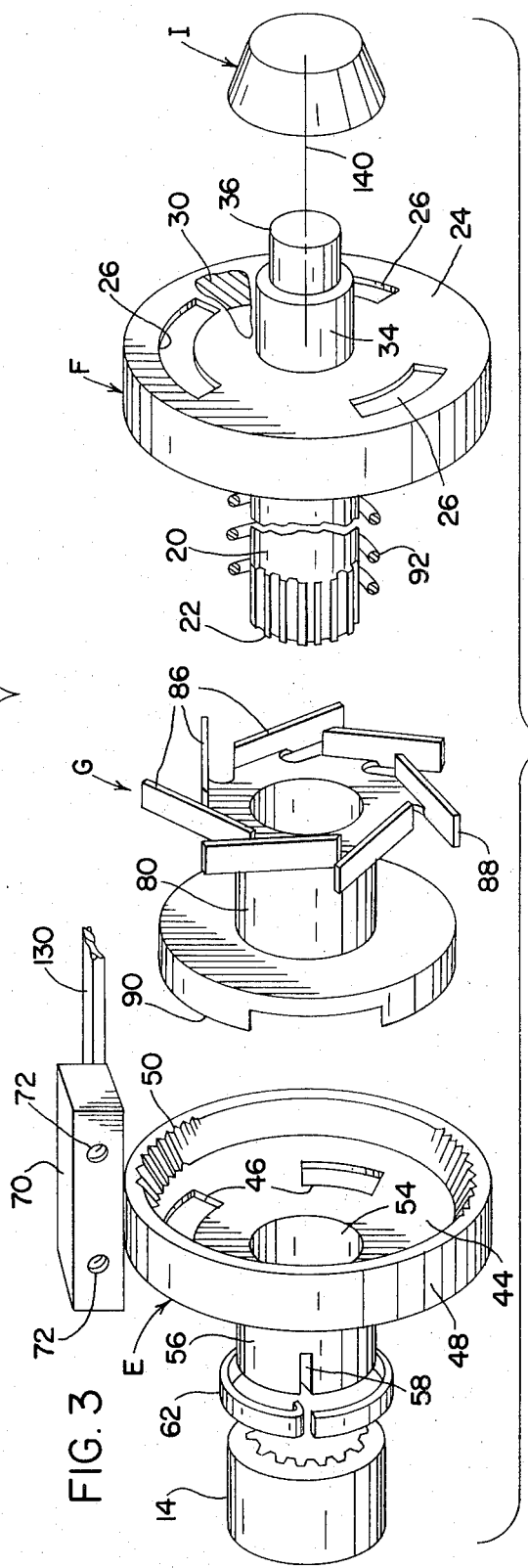
FIG. 2
FIG. 3

RELAY CLUTCH TIMER

BACKGROUND OF THE INVENTION

This application pertains to the art of timers and more particularly to relay clutch timers. The invention is particularly applicable to an improved clutch for use in relay clutch timers. However, it will be recognized that the invention has broader applications and the improved clutch may be used in other devices.

Relay clutch timers are assembled to have a standard clutch feature or a reverse clutch feature. With a standard clutch feature, the clutch is normally disengaged and is engaged upon energization of a relay. With a reverse clutch feature, the clutch is normally engaged and is disengaged upon energization of the relay. In order to accomplish these different operating characteristics with the same relay, it is necessary to use different relay mechanisms. The requirement for two different relay mechanisms makes the timer more expensive to manufacture and assemble.

It would be desirable to have a relay clutch timer which could be assembled with either a standard or reverse clutch feature without requiring different relay mechanisms.

SUMMARY OF THE INVENTION

A relay clutch timer of the type described includes a central clutch element which can be assembled in two different positions so that the timer will have either a standard or reverse clutch feature.

In accordance with one arrangement, the clutch includes a pair of opposite clutch elements having the central clutch element positioned therebetween. All of the clutch elements rotate about a common longitudinal axis. The central clutch element is shiftable axially relative to the opposite clutch elements.

The opposite clutch elements and central clutch element have first drive means thereon. The first drive means on the central clutch element and one of the opposite clutch elements is always engaged for transferring torque between the central clutch element and the one opposite clutch element. Second drive means is provided on the opposite clutch elements and the central clutch element. The central clutch element is axially shiftable between a first position wherein the second drive means on the central clutch element and the other opposite clutch element is engaged, and a second position wherein the second drive means on the central clutch element and the other opposite clutch element is disengaged. Biasing means is provided for biasing the central clutch element to one of the first and second positions. Relay means is provided for moving the central clutch element to the other of its two positions.

In accordance with one arrangement, the first drive means comprises axially engageable projection and recess means on the central clutch element and the opposite clutch elements. The second drive means comprises substantially radially extending teeth on the inner peripheral walls of the opposite clutch elements. The second drive means on the central clutch element comprises a plurality of outwardly extending spider fingers which radially engage the teeth on either of the opposite clutch elements.

In accordance with a preferrred arrangement, there are a substantially greater number of radial teeth on the opposite clutch elements than the number of spider fingers on the central clutch element. In addition, the spider fingers have finger ends which are angularly spaced unequal degrees from one another. The angular spacing of the finger ends is other than a whole multiple of the equal angular spacing of the teeth on the opposite clutch elements. This provides a very high resolution becuase any one of the spider finger ends is engageable between teeth on one of the opposite clutch elements.

In a preferred arrangement, the teeth on the opposite clutch elements slope toward the longitudinal axis in a direction away from the central clutch element to provide somewhat of a cam action when the spider finger ends engage the teeth.

It is a principal object of the present invention to provide an improved relay clutch timer.

It is an additional object of the present invention to provide a relay clutch for a relay clutch timer in such a manner that the same relay mechanism can be used with either a reverse or standard clutch feature.

It is a further object of the present invention to provide a relay clutch timer which is less expensive to manufacture and assemble to provide either a reverse or standard clutch feature.

It is another object of the present invention to provide an improved relay clutch having a very high degree of resolution.

BRIEF DESCRIPTION OF THE DRAWING

The invention may take form in certain parts and arrangements of parts, a preferred embodiment of which will be described in detail in this specification and illustrated in the accompanying drawing which forms a part hereof.

FIG. 2 is a perspective illustration of the improved clutch of the present invention when assembled for a reverse clutch feature;

FIG. 3 is a perspective illustration of the improved clutch of the present invention when assembled for a standard clutch feature;

DESCRIPTION OF A PREFERRED EMBODIMENT

Figure 1:
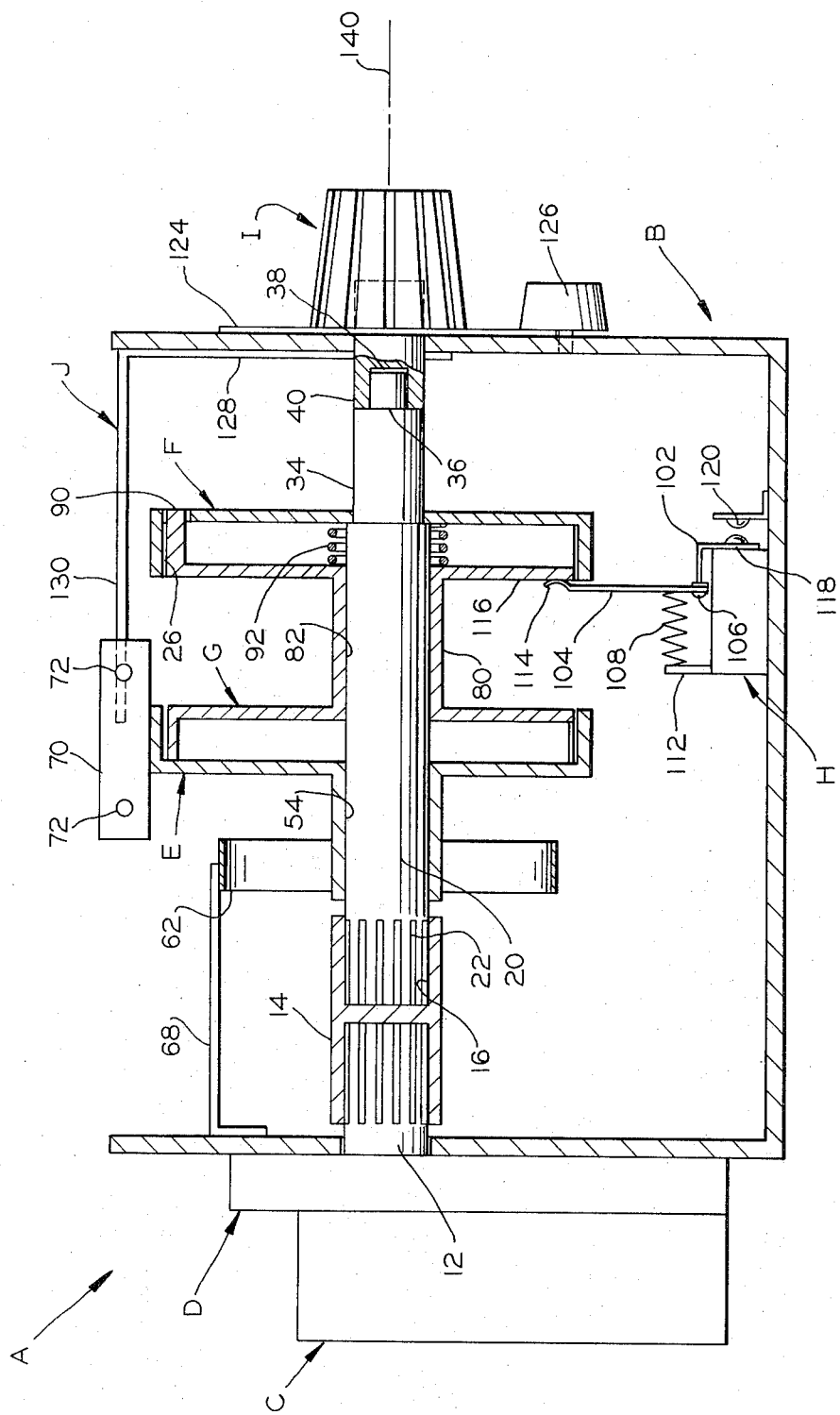
FIG. 1 is a cross-sectional elevational view of a relay clutch timer having the improvements of the present invention incorporated therein.
Figure 5:
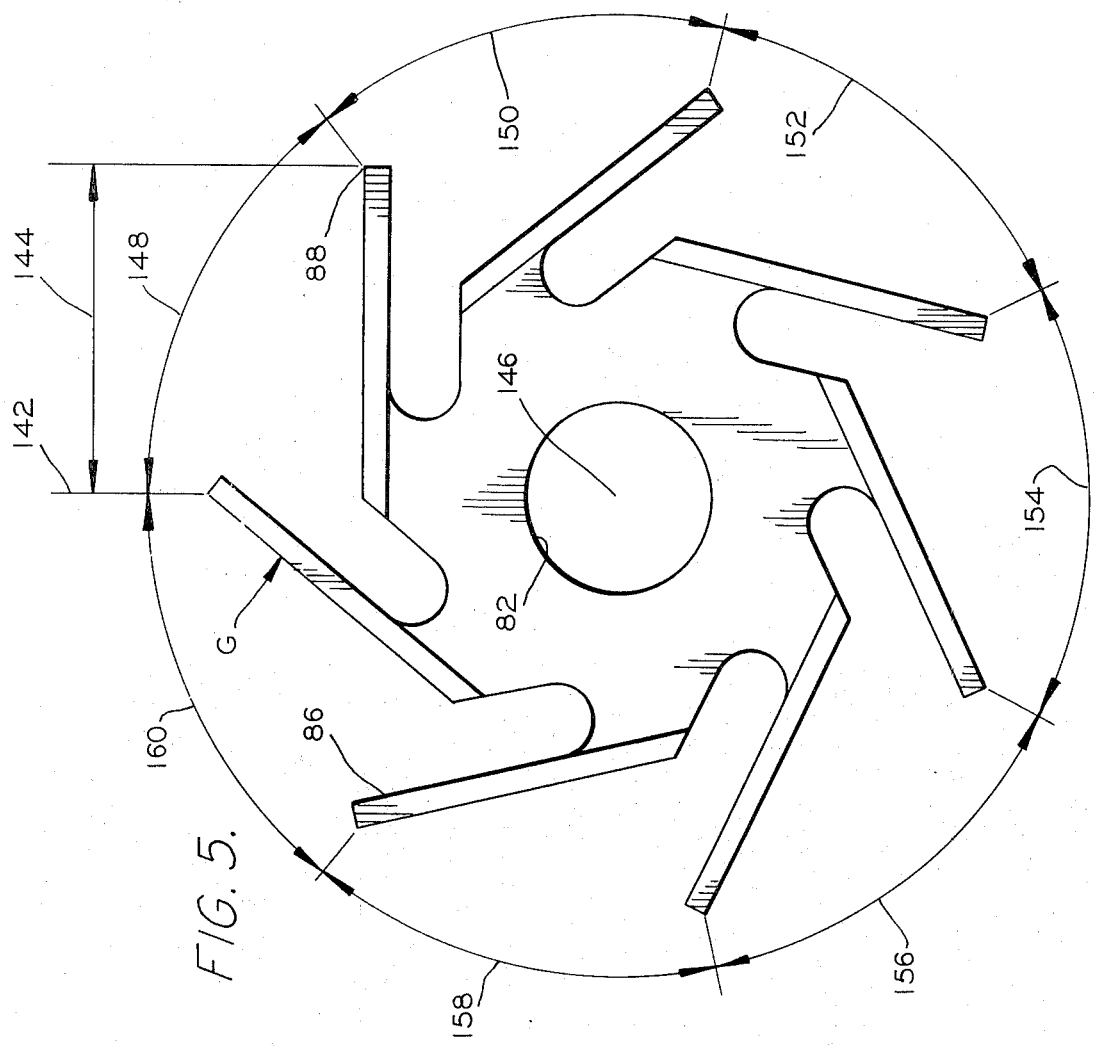

Referring now to the drawing, wherein the showings are for purposes of illustrating a preferred embodiment of the invention only and not for purposes of limiting same, FIG. 1 shows an improved relay clutch timer A having the improved clutch of the present invention incorporated therein.

Timer A includes a frame B for mounting various components thereon. An electric motor C is drivingly connected with a gear box D mounted on frame B and having output shaft 12. A splined socket member 14 having a splined socket 16 is fixed to shaft 12 for rotation therewith.

A pair of opposite clutch elements E and F have a central clutch element G positioned therebetween.

In accordance with one arrangement, opposite clutch element F includes an elongated cylindrical shaft portion 20 having a splined end portion 22 drivingly received within splined socket 16. Opposite clutch member F includes a flat circular bottom wall 24 having a plurality of circumferentially-spaced openings therethrough as at 26. Opposite clutch member F includes a cylindrical peripheral wall 28 extending outwardly from the periphery of bottom wall 24. Peripheral wall 28 includes an inner surface having a plurality of longitudinally extending teeth 30 formed thereon. Opposite clutch element F has an opposite cylindrical portion 34 and a reduced diameter cylindrical portion 36 rotatably received in a cylindrical recess 38 in shaft 40. Shaft 40 is free to rotate relative to shaft 34.

Opposite clutch element E includes a circular flat bottom wall 44 having a plurality of circumferentially-spaced openings 46 therethrough. A generally cylindrical peripheral wall 48 extends outwardly from the periphery of bottom wall 44. Peripheral wall 48 includes an inner surface having longitudinally extending teeth 50 formed thereon. Opposite clutch element E has a centrally located cylindrical hole 54 therethrough and through a cylindrical hub portion 56. Hub portion 56 has a slot as at 58 therein for receiving one end of a flat coiled spring 62. The opposite end of spring 62 is secured to a bracket 68 fixed to frame B. Spring 62 normally biases opposite clutch element E clockwise as viewed from the right hand side of FIG. 1. Opposite clutch element E has a cam or switch operating arm 70 thereon. Cam 70 has threaded holes as at 72 therein for receiving adjustable set screws which contact switches. Further details of how the switches are operated are well-known in the art and form no part of the present invention. Examples of further explanations and details of operation for timers of this type may be found in U.S. Pats. Nos. 3,578,923 issued May 18, 1971, to Morey et al. and 3,725,616 issued Apr. 3, 1973 to Pearson. These two patents are assigned to the same assignee as the present application and are hereby incorporated herein by reference.

Central clutch element G includes a flat circular plate portion 76 spaced from another flat circular plate portion 78 by an integral cylindrical hub portion 80. A centrally located cylindrical hole 82 extends axially through central clutch element G. Plate 76 has a plurality of circumferentially-spaced outwardly extending spider fingers 86 thereon having terminal finger ends 88 receivable between teeth 30 or 50 on opposite clutch elements E and F.

Plate portion 78 of central clutch element G has a plurality of circumferentially-spaced projections 90 thereon receivable in openings 26 or 46 on opposite clutch elements F and E. Central clutch element G is axially shiftable relative to opposite clutch elements E and F when the parts are assembled. Projections 90 are long enough to remain in driving engagement within openings 26 or 46 throughout the entire shifting movement of central clutch element G. A coil spring 92 surrounds cylindrical shaft portion 20 of opposite clutch element F, and bears against the inner surface of bottom wall 24 and the outer surface of plate portion 78 for normally biasing central clutch element G away from opposite clutch element F and toward opposite clutch element E.

An electrical relay H is provided for shifting central clutch element G. Relay H has an actuator 102 connected with an elongated clutch actuator 104 as by screw 106. Actuators 102 and 104 are biased to the left in FIG. 1 by coil spring 108 secured at one end to actuator 104 and at an opposite end to bracket 112. The terminal end portion of clutch actuator 104 is curved as at 114 and is adapted to bear against inner surface 116 of plate portion 78 on central clutch element G. Relay actuator 102 may have electrical contacts as at 118 thereon for cooperation with electrical contacts 120. Contacts 120 may control another operation of a timed cycle.

Shaft 40 has a knob I secured thereto and to indicator plate 124 having a pointer alignable with indicia on frame B for setting a predetermined time in a known manner. A locking knob member 126 is threaded to frame B for clamping against the peripheral edge portion of plate 124 to hold the plate 124 and knob I against rotation away from the time setting. A stop member J has one portion 128 fixed on shaft 40 and an axially extending portion 130 extending behind arm 70 on opposite clutch element E. Axially extending portion 130 defines a stop positioned to the right or clockwise of arm 70 as viewed from the right in FIG. 1.

When the clutch is assembled, shaft portion 20 of opposite clutch element F extends through holes 82 and 54 in clutch elements G and E. Coil spring 92 is positioned between opposite clutch element F and central clutch element G around shaft portion 20. The arrangement shown in FIG. 2 is for a timer having the reverse clutch feature. With the parts assembled as described, edges 88 of spider fingers 86 are biased into driving engagement with teeth 50 on opposite clutch element E by spring 92. Projections 90 on central clutch element G are drivingly engaged with openings 26 in opposite clutch element F. Projections 90, and openings 26 and 46, may be considered a first drive means for transmitting torque between central clutch element G and either one of opposite clutch elements E and F. Teeth 30 and 50, along with spider fingers 86, may be considered a second drive means for transmitting driving torque between the other of the opposite clutch elements and central clutch element G.

When knob I is rotated clockwise to set a desired time setting, stop 130 moves clockwise away from arm 70 on opposite clutch element E. However, arm 70 does not follow stop 130 by clockwise rotation of opposite clutch element E because spider fingers 86 are engaged with teeth 50 and projections 90 are engaged with openings 26. Opposite clutch element F can not rotate clockwise because of its connection with gear box D. When a control function takes place, relay H is energized for moving clutch actuator 104 to the right as viewed in FIGS. 1 and 2. This shifts central clutch element G to the right and disengages spider fingers 86 from teeth 50. Opposite clutch element E is then free to rotate relative to cylindrical shaft portion 20. Torsion spring 62 then causes clockwise rotation of opposite clutch element E until arm 70 strikes stop 130. The timing operation is then ready to take place when a control signal deenergizes relay H. Upon deenergization of relay H, spider fingers 86 will again drivingly engage teeth 50 under biasing force of coil spring 92. Energization of motor C will then drive opposite clutch element F counterclockwise as viewed from the right in FIG. 1. Torque is transmitted through central clutch element G to opposite clutch element E for driving opposite clutch element E counterclockwise. Arm 70 will then reach the switches to be actuated and actuate those switches after the predetermined time set by knob I. The timer may then be stopped or relay H can immediately be energized again for shifting central clutch element G to the right and disengaging spider fingers 86 from teeth 50. This wil immediately result in clockwise rotation of opposite clutch element E by torsion spring 62 until arm 70 again hits stop 130. Thus, it will be seen that the arrangement described with respect to FIGS. 1 and 2 provides a reverse clutch is normally engaged and is disengaged upon energization of a relay. Electrical contacts 118 and 120 may provide other control functons as desired. FIG. 3 shows central clutch element G reversely positioned from the arrangement of FIG. 2. This positioning is for assembly of the clutch with a standard clutch feature. Coil spring 92 now bears against the outer face of plate portion 76 on central clutch element G for shifting central clutch element G axially to the left in FIG. 3. This maintains spider fingers 86 out of engagement with teeth 30 while projections 90 are engaged with openings 46 in opposite clutch element E. A desired time setting may be set by rotating knob I so that stop member 130 moves clockwise away from arm 70. Arm 70 immediately follows stop 130 to the final position set with knob I under action of torsion spring 62 biasing opposite clutch element E clockwise. Spider fingers 86 are disengaged from teeth 30 by spring 92 so that opposite clutch element F and central clutch element G may rotate relative to shaft portion 20 of opposite clutch element F. Timer motor C may be running all the time because no driving will take place as long as the clutch is disengaged. Upon receiving a control signal for a timed operation, relay H will be energized for shifting clutch actuator 104 to the right. This will engage spider fingers 86 with teeth 30 so that opposite clutch elements E and F, and central clutch element G, will be driven counterclockwise until arm 70 strikes the switches it operates at the end of the timed cycle. Relay H will then be deenergized so that spring 92 will disengage fingers 86 from teeth 30 and torsion spring 62 will rotate opposite clutch element E clockwise until arm 70 strikes stop 130.

In the arrangement shown and described, it will be recognized by those skilled in the art that the clutch provides either a standard or reverse clutch feature simply by reversing the position of central clutch element G when the timer is assembled. The same relay and relay actuator is used with no modifications required.

Spider fingers 86 are preferably resilient so that they can slip relative to teeth 30 or 50 in one direction only. For example, knob I may be turned too far when central clutch element G is in its reverse clutch position and fingers 86 are engaged with teeth 50. Knob I can then be turned manually counterclockwise so that stop 130 will act against arm 70 to turn opposite clutch element E counterclockwise. Opposite clutch element E will rotate because the resiliency of fingers 86 in that one direction allows them to bend and slip relative to teeth 50. The same slipping action may occur between spider fingers 86 and teeth 30 when central clutch element G is positioned for a standard clutch feature.

Figure 4:
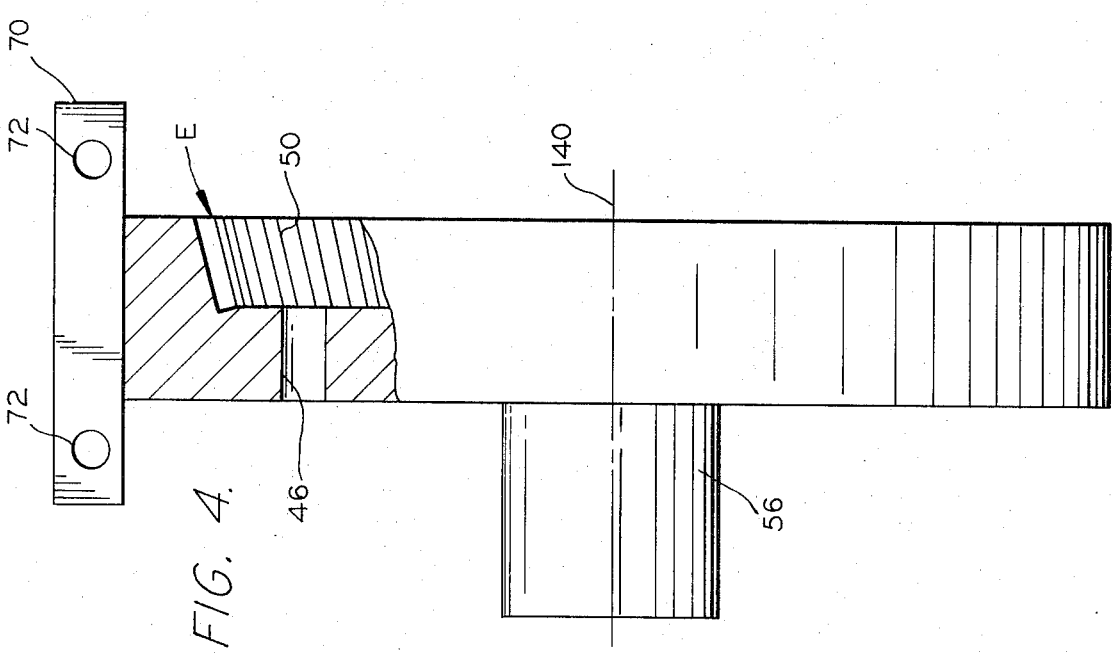
FIG. 4 is a cross-sectional elevational view of one clutch element used with the improved clutch of the present invention; and, FIG. 5 is an end view of a central clutch element used in the improved clutch of the present invention.

The clutch elements rotate about a longitudinal axis 140. In accordance with one arrangement, as shown in FIG. 4, there are 60 teeth 50 having a 90° included angle between the peaks thereof. Teeth 50 extend generally longitudinally of longitudinal axis 140, and are inclined or sloped toward longitudinal axis 140 in a direction away from central clutch element G. This arrangement provides somewhat of a cam action so that spider fingers 86 cam and bend into firm engagement with teeth 50. Teeth 30 are formed in the same manner and also slope toward longitudinal axis 140 at angles of around 15° in a direction away from central clutch element G. Teeth 30 and 50 are equi-angularly spaced.

In the arrangement shown, central clutch element G has seven spider fingers 86 thereon. Spider fingers 86 have a length from radial line 142 to terminal ends 88 of around 0.225 inches as indicated by arrow 144. Outer end edges 88 lie on a radius of around 0.228 inches from center 146 of central clutch element G. Angular spacing 148 is around 51°26'. Angular spacing 150 is around 51°25'. Angular spacing 152 is around 51°26'. Angular spacing 154 is around 51°26'. Angular spacing 156 is around 51°26'. Angular spacing 158 is around 51°25'. Angular spacing 160 is around 51°26'.

Spider fingers 86 are inclined so that their inner surfaces are substantially tangent to a circle drawn about center 146 of central clutch element G. Thus, spider fingers 86 may flex inwardly for allowing relative slippage between central clutch element G and opposite clutch element E and F. However, spider fingers 86 are not readily bendable outwardly due to their firm engagement with teeth 30 or 50 so that slippage can not occur in the driving direction. In the arrangement described, any one of finger end edges 88 may be aligned with a slot between adjacent teeth 30 or 50. Thus, a very high degree of resolution is provided in that virtually no relative rotation need take place when spider fingers 86 move into engagement with teeth 30 or 50. The arrangement described provides 420 possibilities wherein at least one terminal edge 88 of a spider finger 86 will be substantially in alignment between adjacent teeth 30 or 50. Obviously, many different combinations of spider fingers and teeth may be provided for spacing finger ends 88 at angular degrees other than even whole multiples of the angular spacing of teeth 30 and 50 makes it impossible to have more than one spring finger terminal end edge 88 substantially aligned between adjacent teeth for any given position. That one substantially aligned tooth acts somewhat as a guide when the spider fingers shift into driving engagement with teeth 30 or 50. The remaining spider fingers flex slightly as they move into engagement between adjacent teeth. Teeth 30 and 50 are also tapered axially so that they are very narrow adjacent central clutch element G and widen going away from central clutch element G. This provides somewhat of a camming action so that all spider fingers 86 may flex and cam into firm engagement between adjacent teeth.

It will be recognized that many different combinations of teeth 30 and 50 may be made with spider fingers 86. An even or odd number of teeth can be combined with an even or odd number of spider fingers. Preferably, there are a substantially greater number of teeth 30 or 50 than spider fingers 86. The important consideration is that with one spider finger end 88 aligned between adjacent teeth, the remaining spider finger ends are angularly spaced from the one aligned spider finger end in such a manner that none of the other spider finger ends are as closely aligned between adjacent teeth as the one aligned spider finger end. Stated another way, where teeth 30 and 50 are equi-angularly spaced, when one spider finger end is aligned between adjacent teeth, all of the other spider finger ends are angularly spaced from the one aligned spider finger end angular distances other than whole multiples of the angular spacing between adjacent teeth. With such an arrangement, any one of the spider fingers can be aligned between adjacent teeth over 360°. Therefore, the engagement possibilities are equal to the number of teeth 30 or 50 times the number of spider fingers. Central clutch element G is thereby insured of good driving engagement regardless of the relative rotated position between the spider fingers and the teeth. Negligible relative rotation is required in order to engage the spider fingers with the teeth.

In the description, it will be recognized that cylindrical peripheral wall portions 28 and 48 on opposite clutch elements F and E are radially spaced outward from longitudinal axis 140. Teeth 30 and 50, along with spider fingers 86, define a substantially radially engageable drive means between either of the opposite clutch elements and the central clutch element. Cooperating projections 90 and openings 26 or 46 define an axially engageable drive means between the opposite clutch elements and the central clutch element. Peripheral walls 28 and 48 also have terminal ends facing one another across central clutch element G, and teeth 30 and 50 slope toward longitudinal axis 140 from those defined terminal ends of the peripheral wall.

Although the invention has been shown and described with reference to a preferred embodiment, it is obvious that equivalent alterations and modifications will occur to others skilled in the art upon the reading and understanding of this specification. The present invention includes all such equivalent alterations and modifications, and is limited only by the scope of the claims.

Having thus defined my invention, I claim:

1. A relay clutch timer having a clutch means for driving a cam means, said clutch means including: a pair of opposite, axially spaced clutch elements and a central clutch element positioned between said opposite clutch elements; said central clutch element being movable axially between said opposite clutch elements and including a structural element on one axial end and a clutch member on the opposite axial end; each of said opposite clutch elements having connecting means for drivingly receiving said structural element of said central clutch element, said connecting means allowing axial movement of said central clutch element while maintaining said driving connection with said structural element; each of said opposite clutch elements having a clutch member adapted to drivingly engage said clutch member of said central clutch element; means for mounting said central clutch element with said clutch member adjacent one of said opposite clutch elements and said structural element receiving by said connecting means of the other clutch element; and, relay means for moving said central clutch element between a first position with said clutch member of said central clutch element engaged with said clutch member of said one opposite clutch element and a second position with said clutch member of said central clutch element disengaged from said clutch member of said one opposite clutch element.

2. A relay clutch timer having clutch means for driving cam means, said clutch means including a pair of opposite clutch elements and a central clutch element positioned between said opposite clutch elements, first drive means on said opposite clutch elements and on said central clutch element, said first drive means on said central clutch element and on one of said opposite clutch elements being drivingly engaged for transmitting torque between said one opposite clutch element and said central clutch element, said central clutch element and said opposite clutch elements having second drive means thereon for transmitting torque between said central clutch element and the other of said opposite clutch elements, said central clutch element being axially shiftable relative to said opposite clutch elements between a first position wherein said second drive means on said central clutch element and on said other opposite clutch element is engaged and a second position wherein said second drive means on said central clutch element and on said other opposite clutch element is disengaged, biasing means for biasing said central clutch element to one of said first and second positions, and relay means for moving said central clutch element to the other of said positions, said clutch elements rotate about a longitudinal axis, each of said opposite clutch elements having a bottom wall and a peripheral wall, said peripheral wall extending from said bottom wall in outwardly spaced relationship to said longitudinal axis, said peripheral wall having an inner surface facing toward said longitudinal axis, said first drive means on said opposite clutch elements being on said bottom walls thereof, and said second drive means on said opposite clutch elements being on said inner surfaces of said peripheral walls thereof.

3. The timer of claim 2 wherein said second drive means on said inner surfaces of said peripheral walls comprise a plurality of circumferentially spaced teeth extending substantially parallel to said longitudinal axis.

4. The timer of claim 3 wherein said peripheral walls have terminal ends spaced from said bottom walls and said teeth slope inwardly toward said longitudinal axis in a direction from said terminal ends toward said bottom walls.

5. The timer of claim 4 wherein said second drive means on said central clutch element comprises a plurality of circumferentially spaced resilient spider fingers extending outwardly therefrom, said fingers having finger ends engageable with said teeth.

6. The timer of claim 5 wherein there are substantially greater number of said teeth than spider fingers, said finger ends being circumferentially spaced angular degrees other than even multiples of the angular spacing of said teeth.

7. A relay clutch timer having clutch means for driving cam means, said clutch means including a pair of opposite clutch elements and a central clutch element positioned between said opposite clutch elements, first drive means on said opposite clutch elements and on said central clutch element, said first drive means on said central clutch element and on one of said opposite clutch elements being drivingly engaged for transmitting torque between said one opposite clutch element and said central clutch element, said central clutch element and said opposite clutch elements having second drive means thereon for transmitting torque between said central clutch element and the other of said opposite clutch elements, said central clutch element being axially shiftable relative to said opposite clutch elements between a first position wherein said second drive means on said central clutch element and on said other opposite clutch element is engaged and a second position wherein said second drive means on said central clutch element and on said other opposite clutch element is disengaged, biasing means for biasing said central clutch element to one of said first and second positions, relay means for moving said central clutch element to the other of said positions, said first drive means comprises substantially axially extending cooperating projection and recess means on said central and opposite clutch elements, and said second drive means comprises substantially radially extending cooperating projection and recess means on said central and opposite clutch elements.

8. The timer of claim 7 wherein said cooperating projection and recess means on said central and opposite clutch elements comprises a plurality of equi-angularly spaced teeth on said opposite clutch elements and a plurality of resilient spider fingers on said central clutch element, said spider fingers having finger ends angularly spaced angular degrees other than whole multiples of the angular spacing of said teeth, and said teeth being substantially greater in number than said spider fingers.

9. An axially engageable clutch including first and second clutch elements rotatable about a common axis, said first clutch element being axially fixed and having a peripheral wall including an inner surface, a plurality of substantially radially extending equi-angularly spaced teeth on said inner surface, said second clutch element being movable between an engaged position and a disengaged position and having a plurality of outwardly extending resilient spider fingers thereon, said fingers having finger ends engageable with said teeth, said finger ends being angularly spaced from one another angular degrees other than whole multiples of the angular spacing of said teeth and means for selectively shifting said second clutch member between said engaged and disengaged positions.

10. A clutch including a pair of opposite clutch elements and a central clutch element positioned between said opposite clutch elements, said clutch elements being rotatable about a common longitudinal axis, each of said clutch elements having both cooperating axially engageable drive means thereon and cooperating radially engageable drive means thereon, said central clutch element being positionable between said opposite clutch elements with said axially engageable drive means thereon facing engaged with said axially engageable drive means on one of said opposite clutch elements and with said radially engageable drive means thereon facing said radially engageable drive means on the other of said opposite clutch elements, and said central clutch element being axially shiftable relative to said opposite clutch elements between a first position wherein said radially engageable drive means is engaged and a second position wherein said radially engageable drive means is disengaged, said axially engageable drive means being engaged in both of said first and second positions of said central clutch element.

11. The clutch of claim 10 wherein each of said opposite clutch elements includes an axially extending peripheral wall having an inner surface, said radially engageable drive means on said opposite clutch elements being defined by a plurality of equi-angularly spaced longitudinal teeth on said inner surfaces.

12. The clutch of claim 11 wherein said peripheral walls have terminal ends facing one another across said central clutch element, said teeth sloping toward said longitudinal axis in directions from said terminal ends of said peripheral walls away from said central clutch element.

13. The clutch of claim 12 wherein said radially engageable drive means on said central clutch element comprises a plurality of outwardly extending circumferentially spaced resilient spider fingers.

14. The clutch of claim 13 wherein said fingers have finger ends angularly spaced angular distances other than whole multiples of the angular spacing of said teeth, and said teeth being substantially greater in number than said spider fingers.

* * * * *